US012490670B2

(12) United States Patent
Spiekermann et al.

(10) Patent No.: US 12,490,670 B2
(45) Date of Patent: Dec. 9, 2025

(54) SELF-PROPELLED AGRICULTURAL HARVESTER AND METHOD FOR OPERATING A SELF-PROPELLED AGRICULTURAL HARVESTER (71) Applicant: CLAAS Selbstfahrende Erntemaschinen GmbH, Harsewinkel (DE)

(72) Inventors: Sebastian Spiekermann, Ostbevern (DE); Daniel Irmer, Herzebrock-Clarholz (DE); Dennis Neitemeier, Lippetal (DE); Bastian Bormann, Gütersloh (DE); Joachim Baumgarten, Beelen (DE); Andreas Wilken, Bissendorf (DE)

(73) Assignee: CLAAS Selbstfahrende Emtemaschinen GmbH, Harsewinkel (DE)

( * ) Notice: Subject to any disclaimer, the term of this patent is extended or adjusted under 35 U.S.C. 154(b) by 696 days.

(21) Appl. No.: 17/888,620

(22) Filed: Aug. 16, 2022

(65) Prior Publication Data

US 2023/0065442 A1 Mar. 2, 2023

(30) Foreign Application Priority Data

Aug. 17, 2021 (DE) ...................... 10 2021 121 296.0

(51) Int. Cl.
*A01D 34/00* (2006.01)
*A01D 34/14* (2006.01)
*A01D 57/12* (2006.01)
*A01D 61/02* (2006.01)

(52) U.S. Cl.
CPC ............ *A01D 34/006* (2013.01); *A01D 34/14* (2013.01); *A01D 57/12* (2013.01); *A01D 61/02* (2013.01)

(58) Field of Classification Search
CPC ...... A01D 34/006; A01D 34/14; A01D 57/12; A01D 61/02; A01D 57/04; A01D 41/141; A01D 41/1271
See application file for complete search history.

(56) References Cited

U.S. PATENT DOCUMENTS 9,807,926 B2    11/2017  Wilken
2012/0095651 A1*  4/2012  Anderson ............ G05D 1/0291
                                                         701/50

(Continued)

FOREIGN PATENT DOCUMENTS

DE    102015113528 A1    2/2017
DE    102015118767 A1    5/2017

(Continued)

OTHER PUBLICATIONS

European Search Report for European application No. 22173955.0-1105 mailed Nov. 17, 2022.

*Primary Examiner* — Nga X Nguyen
(74) *Attorney, Agent, or Firm* — Lempia Summerfield Katz LLC (57) ABSTRACT A method for operating a self-propelled agricultural harvester with a cutting unit and a self-propelled agricultural harvester are disclosed. A driver assistance system associated with the agricultural harvester includes a memory that saves data and a computing unit for processing data saved in the memory. The driver assistance system and the cutting unit form an automated cutting unit. A harvesting process strategy is selected from a plurality of harvesting process strategies saved in the memory and at least one cutting unit parameter is selected. The at least one cutting unit parameter may be determined autonomously by the computing unit to implement the at least one selected harvesting process strategy and may be specified to the cutting unit. While the automated cutting unit is being controlled according to the (Continued)

selected harvesting process strategy, responsive to detecting a harvesting process situation on a field to be worked, with the harvesting process situation indicative of deviating from the at least one harvesting process strategy, regulation sequences, which temporarily override the execution of the harvesting process strategy, are executed.

20 Claims, 4 Drawing Sheets

(56) References Cited

U.S. PATENT DOCUMENTS

| | | | |
|---|---|---|---|
| 2013/0325242 A1* | 12/2013 | Cavender-Bares | A01C 23/047 |
| | | | 701/25 |
| 2017/0118915 A1* | 5/2017 | Middelberg | A01B 69/008 |
| 2017/0188515 A1 | 7/2017 | Baumgarten | |
| 2018/0084718 A1* | 3/2018 | Baumgarten | A01D 41/1243 |
| 2020/0077585 A1* | 3/2020 | Garbald | A01B 63/108 |
| 2021/0015040 A1 | 1/2021 | Neitemeier et al. | |
| 2021/0235622 A1 | 8/2021 | Baumgarten et al. | |
| 2022/0000025 A1 | 1/2022 | Middelberg et al. | |

FOREIGN PATENT DOCUMENTS

| | | | | |
|---|---|---|---|---|
| DE | 102016118637 A1 | 4/2018 | | |
| DE | 102019112584 A1 | 11/2020 | | |
| EP | 3210447 A1 * | 8/2017 | | A01B 63/002 |
| EP | 3732949 A1 | 11/2020 | | |
| EP | 3766329 A1 | 1/2021 | | |
| EP | 3858129 A1 | 8/2021 | | |

\* cited by examiner

Fig. 4

SELF-PROPELLED AGRICULTURAL HARVESTER AND METHOD FOR OPERATING A SELF-PROPELLED AGRICULTURAL HARVESTER

CROSS REFERENCE TO RELATED APPLICATION

This application claims priority under 35 U.S.C. § 119 to German Patent Application No. DE 10 2021 121 296.0 with filing date Aug. 17, 2021, the entire disclosure of which is hereby incorporated by reference herein.

TECHNICAL FIELD

The present invention relates to a method for operating a self-propelled agricultural harvester and to a self-propelled agricultural harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

U.S. Pat. No. 9,807,926 B2, incorporated by reference herein in its entirety, discloses a method for operating a self-propelled agricultural harvester and a self-propelled agricultural harvester. U.S. Pat. No. 9,807,926 B2 discloses a cutting unit of the agricultural harvester to be regulated that, together with a driver assistance system, forms an automated cutting unit. The driver assistance system has a memory for saving data and a computing unit that is configured to autonomously determine individual cutting unit parameters of the cutting unit and specify them to the cutting unit. In one example, the cutting unit parameters are determined based on a user selection of harvesting process strategies that are saved in the memory of the driver assistance system. The automated cutting unit may adapt the cutting unit to change, such as continuously change, operating conditions in the crop to be harvested, wherein the focus may be on any one, any combination, or all of: the crop height, the crop volume, or the harvested material parameters of the crop (e.g., type of harvested material and/or moisture). The selectable harvesting process strategies may be directed to setting or optimizing at least one harvesting process parameter such as "cutting ear losses" (or "cutting ear/head of corn losses"), "sprayed grain losses", "uniformity of transverse harvested material flow distribution", "temporal variance of harvested material flow", "separation losses", "cleaning losses", "fuel consumption" by a corresponding specification of cutting unit parameters such as "cutting table length" or "extension angle of intake finger".

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed above, the automated cutting unit may relieve or assist the operator of the agricultural harvester by automatically regulating the cutting unit in standardized harvesting process situations, such as oriented around the crop height, the crop volume, and the harvested material parameters of the crop.

Thus, in one or some embodiments, a method and a system are disclosed for operating a self-propelled agricultural harvester in an automated manner to identify and/or control a harvesting process situation on a field to be worked where there are one or more deviations from standardized harvesting process situation(s).

Thus, in one or some embodiments, a method is disclosed for operating a self-propelled agricultural harvester with a cutting unit for cutting and picking up harvested material. The method uses a driver assistance system that is associated with the agricultural harvester (e.g., the driver assistance system controls operations of one or more parts of the agricultural harvester). The driver assistance system may have a computing unit (or other type of computing functionality) and a memory (or a memory to which the driver assistance unit may access) that saves data. The driver assistance system together with the cutting unit may form an automated cutting unit. In particular, at least one harvesting process strategy may be selected from a plurality of harvesting process strategies saved in the memory (e.g., user selected or automatically) and at least one cutting unit parameter is selected (e.g., user selected or automatically). The computing unit of the driver assistance system may autonomously determine value(s) of the at least one cutting unit parameter in order to implement the selected at least one harvesting process strategy. In turn, the value(s) of the at least one cutting unit parameter may be specified, conveyed or transmitted to the cutting unit (e.g., in the form of a command) in order for the cutting unit to automatically control itself (e.g., the cutting unit is configured to receive the value(s) of the at least one cutting unit parameter and to automatically control its operation in order to operate within or according to the value(s) specified for the at least one cutting unit parameter). In one or some embodiments, there may be instances where the selected at least one harvesting process strategy is overridden (such as temporarily overridden). For example, responsive to detecting a defined harvesting process situation (which may be selected from a plurality of harvesting process situations), the cutting unit is instructed contrary to the selected at least one harvesting process strategy. In this regard, while the automated cutting unit is controlling itself according to the at least one selected harvesting process strategy, the driver assistance system may detect the harvesting process situation on or near the field that is subject to the agricultural process. Responsive to detecting the harvesting process situation, the driver assistance system may temporarily override the previous instructions (in the form of the selected harvesting process strategy), such as override at least for the time period while the driver assistance system detects the harvesting process situation. The overriding may be in the form of sending a command to the automated cutting unit to perform one or more actions that are contrary to the selected harvesting process strategy.

In this regard, control or regulation that deviates from the selected at least one harvesting process strategy (responsive to detecting a specific harvesting process situation) may be performed automatically. Thus, temporary overriding, responsive (or during) the specific harvesting process situation, may lead to a more optimal result than would result with the continued execution of the at least one selected harvesting process strategy. In one or some embodiments, in order to relieve the operator in such a specific harvesting process situation and preventively avoid any jams or losses that may arise from such a specific harvesting process situation, the automated cutting unit analyzes the existing harvesting process situation of the agricultural harvester and, if necessary (e.g., responsive to detecting the specific harvesting process situation), automatically triggers the appropriate regulation sequence. As a result, settings of cutting unit parameters of the cutting unit made by the automated cutting unit according to the at least one selected harvesting process strategy may be temporarily overridden. In one or some embodiments, the term "temporarily overriding" means that the execution of the regulation sequence is limited to a period of time and/or a travel distance based on detection of the specific harvesting process situation, such as resulting from the start of the specific harvesting process situation to be detected and to the end of the specific harvesting process situation to be detected. In one or some embodiments, one or more components of the cutting unit may be controlled simultaneously by the regulation sequence, which may not be possible with a manual setting or the operator overriding of the automated cutting unit.

Various harvesting process situations are contemplated that may trigger the override of the selected harvesting process strategy. As one example, in one or some embodiments, detecting the agricultural harvester in a predefined position in or with respect to the field may indicate the harvesting process situation (e.g., any one, any combination, or all of: entering the crop; exiting the crop; or driving in a headland). As another example, in one or some embodiments, entering a crop, driving with a spray track in the crop, exiting a crop, or driving in a headland may be identified as a harvesting process situation.

As one example, when driving into a crop, the crop may be drawn in too late because of the setting according to the at least one selected harvesting process strategy, which may result in crop losses. As another example, when driving with one or more spray tracks in the crop (identified as another harvesting process situation), jams may occur in the cutting unit in the area of the spray tracks due to the setting according to the at least one selected harvesting process strategy. As yet another example, when exiting a crop, the absence of crop behind the harvested material to be harvested last may lead to the harvested material falling forwards (e.g., in the direction of travel of the agricultural harvester), and therefore might not be able to be picked up by the cutting unit due to the setting according to the at least one selected harvesting process strategy, which leads to crop losses. Yet another example, when driving into a headland, depending on the setting according to the at least one selected harvesting process strategy, cut harvested material may remain in the cutting unit without being picked up by the intake auger and fall from the cutting unit while driving in the headland, resulting in corresponding crop losses. In one or some embodiments, detecting these specific harvesting process situations triggers one or more actions, such as the execution of a corresponding the regulation sequence to modify the control of the cutting unit (e.g., sending one or more commands to the cutting unit to override or change the automatic operation of the cutting unit, so that the selected at least one harvesting process strategy, previously sent to the cutting unit to perform automatic control of itself, will be overridden).

In one or some embodiments, the automated cutting unit or the driver assistance system may control various aspect of the cutting unit, such as any one, any combination, or all of: the reel; cutter bar; cutting table; intake auger; or conveyor belts as components of the cutting unit. In particular, the cutting unit may control the various aspect by setting the associated cutting unit parameters including any one, any combination, or all of: "cutter bar height"; "cutting angle"; "cutting table length"; "horizontal reel position"; "vertical reel position"; "reel speed"; "cutting frequency"; "intake auger height"; and "belt speed". The control by the cutting unit may be performed according to the at least one selected harvesting process strategy and may be temporarily overridden by the regulation sequence responsive to detecting harvesting process situation.

Thus, in one or some embodiments, with regard to the harvesting process situation of driving into a crop, the regulation sequence, which performs the override, may be executed responsive to detecting the driving into the crop and may be performed during or while the agricultural harvester is driving into a crop. The override may comprise controlling the cutting unit parameter "vertical reel position" to deviate from the setting by the automated cutting unit in accordance with the at least one selected harvesting process strategy, such as, for example, setting the reel lower. This may ensure that the harvested material at the front at the start of a lane is picked up earlier by the reel and drawn in. In particular, in one or some embodiments, after determining that the driving into the crop has ended, the cutting unit may be returned to its control according to the at least one selected harvesting process strategy.

Moreover, in one or some embodiments, with regard to the harvesting process situation of driving with a spray trail, the regulation sequence, which performs the override, may be executed responsive to detecting the driving with the spray trail and may be performed during or while the agricultural harvester is driving with the spray trail. The override may comprise controlling the cutting unit parameters "vertical reel position" and "cutting table length" to deviate from the setting by the automated cutting unit in accordance with the at least one selected harvesting process strategy, such as, for example, lowering the reel cyclically and at the same time reducing the extension length of the cutting table. In one or some embodiments, cyclic means the repeated adjustment of the vertical reel position within a defined period of time and/or a travel path. The temporal or almost simultaneous change in the extension length of the cutting table, in conjunction with the cyclical lowering of the reel, may have the effect that any crop flow jams in the cutting unit in the area of the spray trail may be undone, or the occurrence of crop flow jams may be prevented. Further, in one or some embodiments, after determining that the driving with the spray trail has ended, the cutting unit may be returned to its control according to the at least one selected harvesting process strategy.

In addition, in one or some embodiments, with regard to the harvesting process situation of exiting a crop, the regulation sequence, which performs the override, may be executed responsive to detecting the exiting of the crop and may be performed during or while the agricultural harvester is exiting the crop. The override may comprise controlling the cutting unit parameter "vertical reel position" to deviate from the setting by the automated cutting unit in accordance with the at least one selected harvesting process strategy, such as, for example, lowering the reel. This may ensure that the harvested material standing at the outermost edge of the crop at the end of a lane is at least grasped and drawn in by the lowered reel before the harvested material is cut by the cutter bar. Further, in one or some embodiments, after determining that the exiting of the crop has ended, the cutting unit may be returned to its control according to the at least one selected harvesting process strategy. Still alternatively, after determining that the exiting of the crop has ended, the cutting unit may return to another control strategy (e.g., different from the at least one selected harvesting process strategy) or may request a new control strategy from the operator.

Furthermore, in one or some embodiments, with regard to the harvesting process situation of driving into the headland, the regulation sequence, which performs the override, may be executed responsive to detecting the driving into the headland and may be performed during or while the agricultural harvester is driving into the headland. The override may comprise controlling the cutting unit parameters "horizontal reel position" and "cutting table length" to deviate from the setting by the automated cutting unit in accordance with the at least one selected harvesting process strategy, such as, for example, lowering the reel and then reducing the reel extension length at the same time as the cutting table extension length. Lowering the reel and then simultaneously reducing the extension length of the reel and the extension length of the cutting table, may cause the cutting unit to be cleaned in that harvested material remaining on the cutting table may be fed to the intake auger after leaving the crop to then be conveyed into the agricultural harvester. In particular, the override triggered by detection of the driving into the headland (thereby triggering the regulation sequence resulting in the cleaning) may be terminated before again entering the crop. In particular, the reel and the cutting table may be returned to their intended working position according to the at least one harvesting process strategy.

In one or some embodiments, responsive to detecting a harvesting process situation that causes the execution of one of the regulation sequences, one or both of forefield information or machine-specific parameters may be recorded by at least one sensor assembly.

In one or some embodiments, any one, any combination, or all of a crop height, a crop edge, reaching the crop when driving into a crop and leaving the crop when driving out of the crop may be determined as forefield information (and may be recorded by the driver assistance system responsive to detecting the harvesting process situation), and any one, any combination, or all of a set cutting unit height, a layer height in a conveying device downstream from the cutting unit, a steering angle, a driving speed and a set steering mode for lane guidance may be recorded by the driver assistance system as machine-specific parameters responsive to detecting the harvesting process situation.

In one or some embodiments, the crop edge or a spray trail may be used as a control variable for controlling or regulating the lane guidance in the respective steering mode.

In one or some embodiments, the driver assistance system may have a sensor assembly for generating forefield information. The sensor assembly may have a laser-based sensor system which scans the forefield area with electromagnetic transmission beams running in a plurality of scanning planes in order to generate distance information on a predetermined, relevant forefield area of the agricultural harvester. The laser-based sensor system may calculate respective contact line for the scanning planes from the distance information, and the three-dimensional nature of the forefield area may be inferred from the arrangement and/or shape of the contact lines associated with the scanning planes. In one or some embodiments, at least three scanning planes are provided. More scanning planes are contemplated in order to be able to infer the three-dimensional nature of the forefield area.

In one or some embodiments, the laser-based sensor system may detect harvested crop (e.g., in the headland area), standing crop, a transition from standing crop to headland or from headland to standing crop in the forefield area. As such, the laser-based sensor system may assist in detecting one or more harvesting process situations.

In one or some embodiments, responsive to detecting a harvesting process situation, other working units of the harvesting machine may be controlled (such as controlled by executing the regulation sequence). In one or some embodiments, a decentralized control system may be assigned to each of the other working units of the agricultural harvester.

In particular, several working units of the agricultural harvester may be controlled by the executed regulation sequence. The execution of a regulation sequence may have the advantage that several working units of the agricultural harvester may be controlled simultaneously and in coordination with each other, which may not be achieved manually by an operator of the agricultural harvester.

In one or some embodiments, a self-propelled agricultural harvester is disclosed, having a cutting unit for cutting and picking up harvested material, and having a driver assistance system which has a memory for storing data and a computing unit for processing data stored in the memory. The driver assistance system together with the cutting unit may form an automated cutting unit. Further, at least one harvesting process strategy from a plurality of harvesting process strategies stored in the memory may be selected. The computing unit of the driver assistance system may autonomously determine one or more cutting unit parameters for implementing the at least one selected harvesting process strategy and to specify the one or more cutting unit parameters to the cutting unit. In turn, the cutting unit may automatically implement the one or more cutting unit parameters in order to operate according to the selected at least one harvest process strategy. Further, the computing unit is configured, while executing the at least one selected harvesting process strategy by the automated cutting unit, to temporarily override the execution of the selected at least one harvesting process strategy. Specifically, responsive to detecting a harvesting process situation, a deviation or temporary overriding of the control according to the selected at least one harvesting process strategy is performed. Any discussion regarding the method may be equally applied to the self-propelled agricultural harvester.

Figure 1:
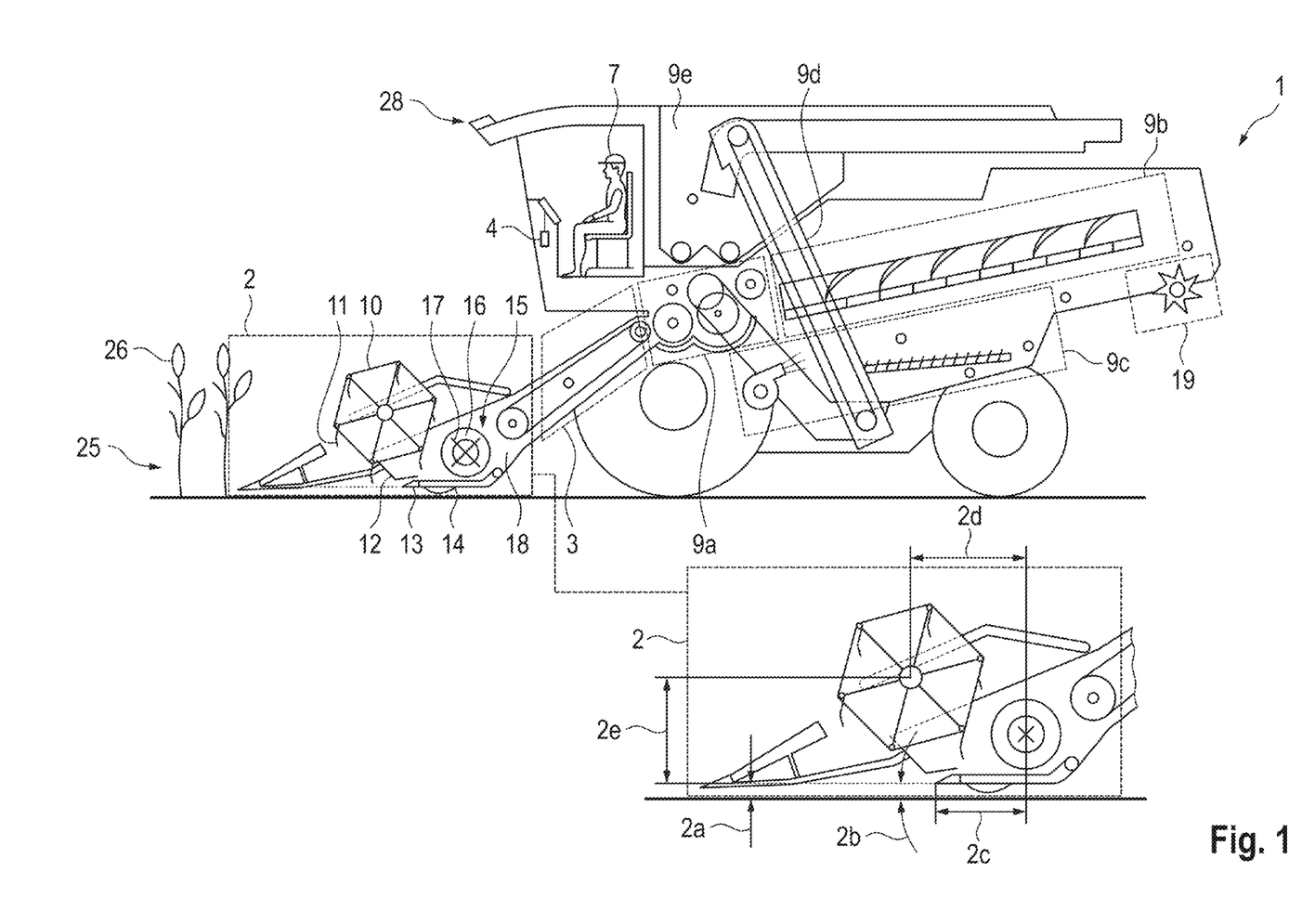
FIG. 1 shows a side view of a harvester designed as a combine.

Referring to the figures, FIG. 1 shows a side view of a self-propelled agricultural harvester 1 designed as a combine. An example of a combine is disclosed in US Patent Application Publication No. 2017/0188515 A1, incorporated by reference herein in its entirety. The agricultural harvester 1 has a cutting unit 2 designed as a harvesting header for cutting and picking up harvested material. The cutting unit 2 may be exchangeable with another cutting unit 2 so that the agricultural harvester 1 may be adapted to harvesting different types of crops. The harvested crop may be understood to be some or all of the material received from the through the cutting unit 2. As illustrated in FIG. 1, a standing crop 26 is mown by the cutting unit 2 on a field 25 to be harvested, and the harvested material obtained thereby is supplied to an inclined conveyor 3.

Figure 2:
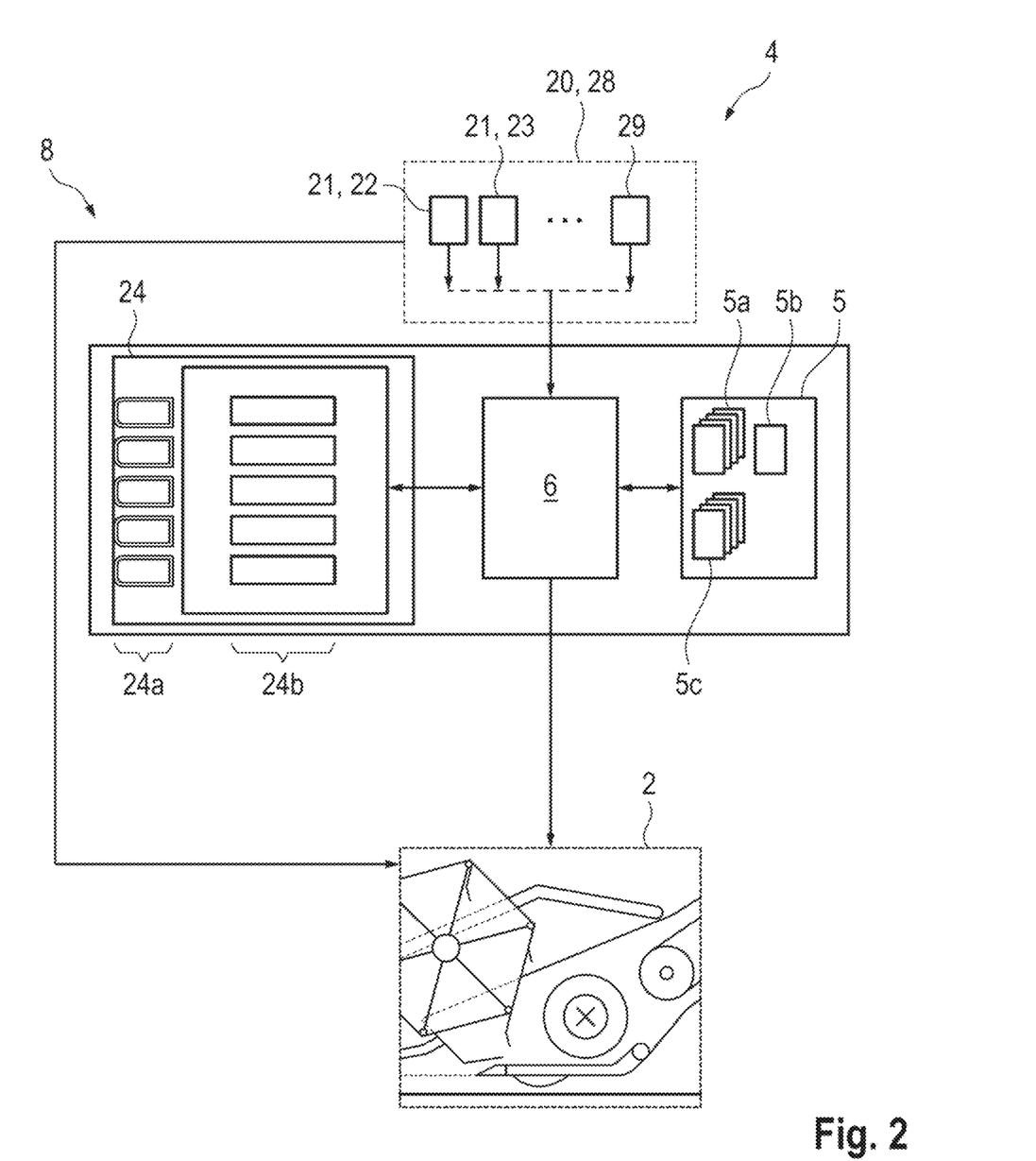
FIG. 2 shows a schematic representation of a driver assistance system of the agricultural harvester.

The agricultural harvester 1 furthermore includes a driver assistance system 4 for controlling the cutting unit 2. This driver assistance system 4 comprises a memory 5 for saving data and a computing unit 6 for processing the data saved in the memory 5. In one or some embodiments, the driver assistance system 4 is configured to assist an operator 7 of the agricultural harvester 1 to operate the agricultural harvester 1. The driver assistance system 4 with the memory 5 and the computing unit 6 are schematically shown in FIG. 2.

Various types of computing functionality are contemplated, such as illustrated by memory 5 and computing unit 6. In one or some embodiments, computing unit 6 may comprise any type of computing functionality, such as at least one processor 38 (which may comprise a microprocessor, controller, PLA, or the like). Similarly, the memory 5 may comprise any type of storage device (e.g., any type of memory). Though the computing unit 6 and the memory 5 are depicted as separate elements, they may be part of a single machine, which includes a microprocessor (or other type of controller) and a memory. Alternatively, the computing unit 6 may rely on memory 5 for all of its memory needs.

The computing unit 6 and memory 5 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the cutting unit 2 together with the driver assistance system 4 form the automated cutting unit 8. This may be realized in that a plurality of selectable harvesting process strategies 5a may be saved in the memory 5, and the computing unit 6 may be configured to autonomously determine at least one cutting unit parameter for the cutting unit 2 and specify the determined at least one cutting unit parameter to the cutting unit 2 to automatically implement the selected harvesting process strategy 5a or harvesting process strategies 5a.

In one or some embodiments, the determination of the cutting unit parameters is an autonomous determination to the extent that, in principle, the at least one selected harvesting process strategy 5a is implemented by the computing unit 6 without any intervention by the operator 7 or a query to the operator 7 being necessary in the determination of the cutting unit parameters. Such an intervention by the operator 7 may still be possible in principle, but unnecessary. The stored harvesting process strategies 5a may differ from one another in terms of the target of the setting or the optimization of harvesting process parameters.

In the depicted embodiment, the agricultural harvester 1 is designed as a self-propelled combine. Accordingly, a threshing unit 9a is downstream from the cutting unit 2 for threshing picked up harvested material. Downstream from the threshing unit 9a in the process is a separating assembly 9b. The stream of harvested material supplied to the threshing unit 9a is then supplied to the separating assembly 9b without the obtained grains. In the separating assembly 9b, the grain remaining in the harvested material is separated, if possible, from the straw and other non-grain components. The grain obtained in threshing unit 9a and separating assembly 9b is then fed to a cleaning assembly 9c. In the cleaning assembly 9c, non-grain components still carried along in the grain up to this point are then separated from the grain. Subsequently, the cleaned grain material enters a grain tank 9e by means of a grain elevator 9d. The threshed straw (e.g., the remaining harvested material in the separator assembly 9b) is deposited by the agricultural harvester 1 (e.g. as a swath along the lane).

In one or some embodiments, the cutting unit 2 of the depicted harvester 1 has a reel 10 running perpendicular to the driving direction of the agricultural harvester 1 that acts on the still uncut harvested material through tines 11 arranged thereupon. The reel 10 has the primary task of supplying the harvested material to a cutter bar 12 that has a movable blade 13. The blade 13 oscillates with a cutting frequency so that the harvested material is cut and falls onto a longitudinally adjustable cutting table 14, on the front side of which the cutter bar 12 is located. Then the harvested material, potentially with the continued influence of the reel 10, is supplied to the inclined conveyor 3 by an auger 15. In an embodiment of the cutting unit 2 as a belt cutting unit, a plurality of conveyor belts are provided to receive and discharge the harvested material cut by the cutter bar 12.

For this purpose, the intake auger 15 is equipped with plates 16, which may be arranged on both sides of a central area of the intake auger 15, which is also referred to as the "intake area". As a result, the cut harvested material is first transported to the intake area of the intake auger 15 and from there to the inclined conveyor 3. In the intake area, several intake fingers 17 are assigned to the intake auger 15 and, in relation to the roller rotation, each cyclically extend from the intake auger 15 at an extension angle of the intake auger 15, and retract into the intake auger 15 at an entry angle of the intake auger 15. The retraction of the intake fingers 17 may be necessary to prevent any harvested material that has been drawn in from passing completely around the intake auger 15 without being transferred to the inclined conveyor 3. All of the above components of the cutting unit 2 may be arranged on a support frame 18, which may be composed of several frame parts.

Depending on the equipment, the cutting unit 2 may permit the adjustment of various cutting unit parameters using corresponding drives (not shown here) that may be controlled by the driver assistance system 4. For example, the driver assistance system 4 may generate one or more commands to send to the cutting unit 2. Responsive to receiving the commands, the cutting unit 2 may control the corresponding drives.

The cutter bar 12, for example, may be assigned the cutting unit parameter 2a "cutter bar height" and the cutting unit parameter 2b "cutting angle", as shown in FIG. 1. The cutting table 14 whose length may be changed is assigned to the cutting unit parameter 2c of "cutting table length". The reel 10 is assigned the cutting unit parameter 2d "horizontal reel position" and the cutting unit parameter 2e "vertical reel position". Furthermore, the cutting unit parameters "intake auger speed", "reel speed" and "cutting frequency" may form further cutting unit parameters, which may be set by means of the driver assistance system 4.

The above-mentioned cutting unit parameters 2a to 2e may not only influence the function of the cutting unit 2 in the narrower sense, but also the function of the downstream working units, such as the function of any one, any combination, or all of the threshing unit 9a, the separating assembly 9b and the cleaning assembly 9c. If necessary, a chopping and distributing assembly 19 for chopping the straw and then distributing the non-grain components in the field is taken into account, which may also be influenced by the cutting unit parameters of the cutting unit 2.

In one or some embodiments, a functional system model 5b for at least part of the agricultural harvester 1 may be saved in the memory 5 of the driver assistance system 4, wherein the computing unit 6 performs the above-addressed autonomous determination of the at least one cutting unit parameter 2a to 2e based on the system model 5b. In one or some embodiments, the functional system model 5b is a computational model for depicting functional relationships within the agricultural harvester 1. The system model 5b may be adjusted to the current harvesting process state by the computing unit 6 during the ongoing harvesting operation. The term "harvesting process state" may include information concerning the harvesting process. This may include crop information such any one, any combination, or all of "crop density", "crop height", "crop moisture", "stalk length" and "lodged grain".

In one or some embodiments, a sensor assembling 20 is provided for detecting at least part of the harvesting process state. In one or some embodiments, the sensor assembly 20 is equipped with a plurality sensors 21. For example, the sensor assembly 20 has a material flow sensor 22 for detecting the flow of harvested material. The material flow sensor 22 may, for example, be camera-based and provide information about the harvesting process parameters "uniformity of transverse distribution of harvested material flow" and/or "temporal variance of harvested material flow". Alternatively or additionally, the sensor assembly 20 may have a crop sensor 23 for detecting crop information. Alternatively or in addition to the detection of the harvesting process state using a sensor assembly 20, it may also be provided that an input/output device 24 is assigned to the driver assistance system 4, wherein at least a part of the harvesting process state may be input by the input/output device 24. In this case, the situation may be such that the computing unit 6 generates queries relating to the current harvesting process state and outputs them via the input/output device 24. In response to such a query, the operator 7 may input at least part of the harvesting process state via the input/output device 24. For this purpose, the input/output device 24 has corresponding input elements 24a and output elements 24b.

The harvesting process strategies 5a that may be selected by the operator 7 may each be directed to different target conditions. Therefore, at least one harvesting process strategy 5a may be directed towards the target of setting or optimizing at least one harvesting process parameter such as "cutting ear losses", "spraying grain losses", "uniformity of transverse distribution of harvested material flow", "temporal variance of harvested material flow", "separation losses", "cleaning losses" or "fuel consumption" or the like. The harvesting process strategy 5a may be implemented in each case by a corresponding specification of cutting unit parameters.

The main function of the automated cutting unit 8 is to adapt the cutting unit parameters to the changing crop information. In addition, harvesting process situations may occur which may deviate from a standardized harvesting process situation on which the functional system model 5b is based.

Thus, in one or some embodiments, in the process of working the field 25, responsive to detecting an event that deviates from the standard harvesting process situation, such as detecting a defined one or more harvest process situations that warrant deviation, one or more automatic actions are performed, such as commanding a deviation from the selected at least one harvesting process strategy.

In this regard, in one or some embodiments, while the cutting unit 2 is being controlled according to the selected at least one harvesting process strategy 5a by the active automated cutting unit 8, responsive to detecting a specific harvesting process situation on a field 25 that is being or is to be worked, with the specific harvesting process situation selected from a set of one or more situations in which a deviation from the selected at least one harvesting process strategy 5a is warranted, the execution of a harvesting process strategy 5a is temporarily overridden by the execution of regulation sequences 5c saved in the memory 5. In one or some embodiments, responsive to detecting the specific harvesting process situation, an automatic deviation (e.g., the stored in regulation sequence 5c) from the selected at least one harvesting process strategy 5a for the specific harvesting process situation is performed, which may lead to a more optimal result than would occur with the continued execution of the selected at least one harvesting process strategy 5a.

In order to relieve the operator 7 in such a specific harvesting process situation and preventively avoid any jams or losses that may arise from such a specific harvesting process situation, the automated cutting unit 8 automatically analyzes the existing harvesting process situation of the agricultural harvester 1 and, if warranted, triggers the appropriate automatic regulation sequence 5c for the detected specific harvesting process situation. As a result, settings of cutting unit parameters of the cutting unit 2 made by the automated cutting unit 8 according to the selected at least one harvesting process strategy 5a are automatically temporarily overridden. Responsive to detecting that the harvesting process situation of agricultural harvester 1, which triggered the override, has ended, the selected harvesting process strategy 5a may be implemented again, such as with its last selected settings (e.g., the settings that were selected prior to the override).

Detecting the harvesting processing situation may occur in one of several ways. In one way, to detect the harvesting process situation that causes the execution of regulation sequences 5c saved in the memory 5, forefield information and/or machine-specific parameters may be recorded by at least one sensor assembly 28 and analyzed to determine whether the forefield information and/or the machine-specific parameters indicate one of the harvesting process situations that warrant the override. In one or some embodiments, forefield information may comprise any one, any combination, or all of a crop height, a crop edge, reaching the crop 26 while driving into the crop and leaving the crop 26 when driving out of the crop. Further, machine-specific parameters may comprise any one, any combination, or all of a set cutter height, a layer height in the inclined conveyor 3, a steering angle, a driving speed as well as a set steering mode for lane guidance. In one or some embodiments, the machine-specific parameters may be detected by the driver assistance system 4 using one or more sensor systems.

Figure 3:
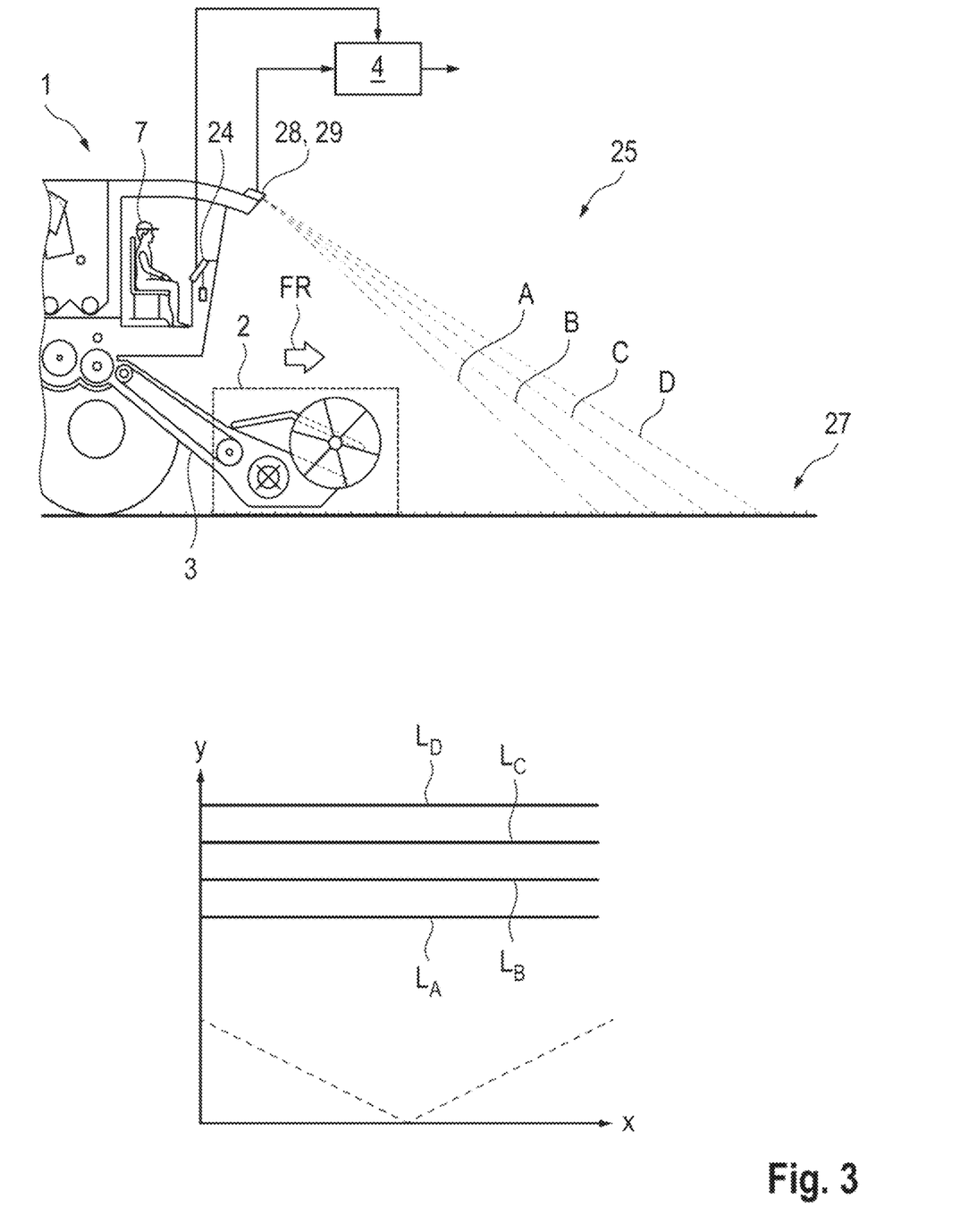
FIG. 3 shows an example of the agricultural harvester in a side view in a harvested state.

FIG. 3 shows the agricultural harvester 1 in a side view in the harvested crop 27 of the field 25, which moves in the direction of travel FR. The driver assistance system 4 has another sensor assembly 28 for generating forefield information (e.g., information about a forefield area ahead as viewed in the direction of travel FR of the agricultural harvester 1). The sensor assembly 28 has a laser-based sensor system 29, for example a sensor system based on a Lidar sensor, and if applicable an optional camera-based sensor system, which may both be arranged on the agricultural harvester 1 in an elevated position relative to the field plane, such as on the cab roof of the agricultural harvester 1.

The laser-based sensor system 29 is set up to generate distance information to a predetermined, relevant forefield area of the field 25, in which a standing crop 26 or, as indicated in FIG. 3, a harvested crop 27, also referred to as a stubble field, is located. The laser-based sensor system 29 of the agricultural harvester 1 may scan the forefield area with electromagnetic transmission beams running in one or several scanning planes A, B, C, D, wherein a contact line LA, LB, LC, LD may be calculated by the laser-based sensor system 29 for the scanning planes A, B, C, D from the distance information in each case. The representation of only four scan planes A, B, C, D is to be understood as merely an example. In principle, the number of scan planes may be higher, which improves the accuracy of the scanning, or may be lower.

The three-dimensional nature of the forefield area may be inferred from the arrangement and/or the shape of the contact lines LA, LB, LC, LD assigned to the different scan planes A, B, C, D. The different distances between the contact lines LA, LB, LC, LD of successive scan planes A, B, C, D result from the fact that the scan planes A, B, C, D may be aligned in such a way that they contact the plane or the horizontal enveloping surface of the standing crop 26 at a relatively flat angle. Therefore, when the crop 27 is harvested, the scan planes A, B, C, D spread out further than is the case when the crop 26 is standing, because when the crop 26 is standing, the distance from the point from which the transmitted beams are emitted to the scanned enveloping surface is shorter than to the field plane. Using the laser-based sensor system 29, harvested crop 27, standing crop 26, a transition from standing crop 26 into the headland or from the headland into a standing crop 26 may be detected in the headland area. With regard to the detailed mode of operation of the laser-based sensor system 29 in question, reference is made to DE 10 2019 112 584 A1, the contents of which are incorporated by reference herein in their entirety.

Figure 4:
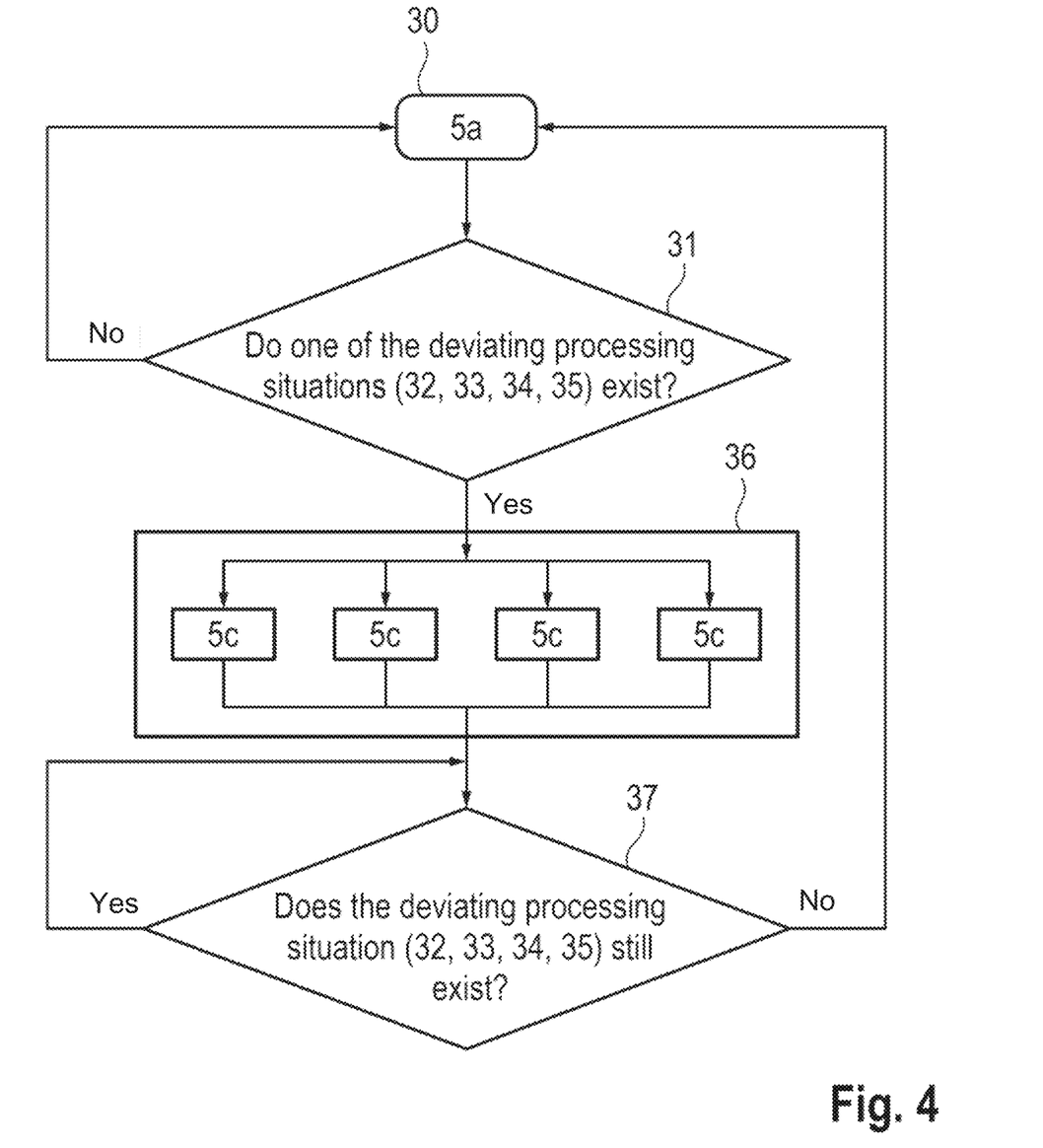
FIG. 4 shows a simplified flowchart to illustrate the disclosed method.

FIG. 4 shows a simplified flowchart to illustrate the disclosed method. The starting point in method step 30 is the at least one harvesting process strategy 5*a* selected by the operator 7.

In method step 31, the forefield information provided by the sensor assembly 28 is evaluated by the driver assistance system 4. The evaluation is used to determine the presence of a deviating harvesting process situation, which by way of example, may comprise any one, any combination, or all of entering a crop 32, driving with a spray trail 33, exiting a crop 34 or driving into the headland 35. If no deviating harvesting process situation is detected by the sensor assembly 28 in the method step 31, the regulation of the cutting unit 2 by the automated cutting unit 8 is continued unchanged according to the at least one selected harvesting process strategy 5*a*. If the answer is affirmative, there is a transition to method step 36.

In method step 36, the regulation sequence 5*c* is selected according to the detected deviating harvesting process situation, which corresponds to the particular detected deviating harvesting process situation, entering a crop 32, driving with a spray trail 33, exiting a crop 34 or driving in the headland 35. Thus, in one or some embodiments, the specific detected harvesting process situation, which warrants the deviation, may further determine the one or more steps to perform for the override. For example, the differentiation between the individual harvesting process situations of entering a crop 32, driving with a spray trail 33, exiting a crop 34 or driving in the headland 35 takes into account the measures to be taken for the overriding setting of the cutting unit 2 or its units, the reel 10 and cutting table 14 or conveyor belts, in the case of a cutting unit 2 designed as a belt cutting unit.

For example, responsive to detecting driving into a crop 32, one or more specific cutting unit commands (e.g., driving into a crop command(s)) may be sent to the cutting unit 2 tailored to the harvesting process situation of driving into a crop 32. In particular, a regulation sequence may be executed when the harvesting process situation of driving into a crop 32 is detected, through which the cutting unit parameter "vertical reel position" is controlled that deviates from the setting by the automated cutting unit 8 in accordance with the selected at least one harvesting process strategy 5*a*, in order to set the reel 10 lower.

Similarly, responsive to detecting driving with a spray trail 33, one or more specific cutting unit commands (e.g., driving with a spray trail command(s)) may be sent to the cutting unit 2 tailored to the harvesting process situation of driving with a spray trail 33. In particular, a regulation sequence 5*c* is executed when the harvesting process situation of driving with a spray trail 33 in a standing crop 26 is detected, through which the cutting unit parameter "vertical reel position" 2*e* and "cutting table length" 2*c* are controlled deviating from the settings by the automated cutting unit 8 in accordance with the at least one selected harvesting process strategy 5*a*, in order to lower the reel 10 cyclically and at the same time reduce the extension length of the cutting table 14.

Moreover, responsive to detecting exiting a crop 34, one or more specific cutting unit commands (e.g., exiting a crop command(s)) may be sent to the cutting unit 2 tailored to the harvesting process situation of exiting a crop 34. In particular, a regulation sequence 5*c* is executed when the harvesting process situation of exiting a crop 34 is detected, through which the cutting unit parameter "vertical reel position" 2*e* is controlled deviating from the setting by the automated cutting unit 8 in accordance with the at least one selected harvesting process strategy 5*a*, in order to lower the reel 10.

In addition, responsive to detecting driving into the headland 35, one or more specific cutting unit commands (e.g., driving into the headland command(s)) may be sent to the cutting unit 2 tailored to the harvesting process situation of driving into the headland 35. In particular, a regulation sequence is executed when the driving into the headland 35 harvesting process situation is detected, through which the cutting unit parameters "horizontal reel position" 2*d* and "cutting table length" 2*c* are controlled deviating from the settings by the automated cutting unit 8 in accordance with the at least one selected harvesting process strategy 5*a*, in order to lower the reel 10 and then reduce the reel 10 extension length at the same time as the cutting table 14 extension length.

The override of the at least one harvesting process strategy 5*a*, which was selected by the operator 7, performed in accordance with the respective regulation sequence 5*c*, ends as soon as it is detected in method step 37 that the deviating harvesting process situation, entering a crop 32, driving with a spray trail 33, exiting a crop 34 or driving in the headland 35, depending on whether the respective harvesting process situation continues to exist or no longer exists. As previously explained with respect to method step 31, the forefield information provided by the sensor assembly 28 is evaluated by the driver assistance system 4 in order to determine the persistence of the detected deviating harvesting process situation 32, 33, 34 or 35 or its end. If it is determined in method step 37 that the deviating harvesting process situation still exist, regulation sequence 5c remains active (e.g., the temporary override is continued). If, on the other hand, it is determined in method step 37 that the deviating harvesting process situation has ended (e.g., the agricultural harvester 1 has again entered the standing crop 26), the override is ended. The automated cutting unit 8 may regulate the cutting unit parameters again according to the harvesting process strategy 5a selected by the operator 7.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural harvester
2 Cutting unit
2a Cutter bar height
2b Cutting angle
2c Cutting table length
2d Horizontal reel position
2e Vertical reel position
3 Inclined conveyor
4 Driver assistance system
5 Memory
5a Harvesting process strategy
5b System model
5c Regulation sequence
6 Computing unit
7 Operator
8 Automated cutting unit
9a Threshing system
9b Separating assembly
9c Cleaning assembly
9d Grain elevator
9e Grain tank
10 Reel
11 Tines
12 Cutter bar
13 Blade
14 Cutting table
15 Intake auger
16 Plate
17 Intake finger
18 Support from
19 Chopping and distributing assembly
20 Sensor assembly
21 Sensor
22 Material flow sensor
23 Crop sensor
24 Input/output device
24a Input element
24b Output element
25 Field to be harvested
26 Standing crop
27 Harvested crop
28 Sensor assembly
29 Laser-based sensor system
30 Method step
31 Method step
32 Entering a crop
33 Driving with a spray trail
34 Exiting a crop
35 Driving in a headland
36 Method step
37 Method step
38 Processor
39 Memory
A-D Scan planes
FR Driving direction
LA-LD Contact lines

The invention claimed is:

1. A method for operating a self-propelled agricultural harvester with a cutting unit for cutting and picking up harvested material, the method comprising:
  selecting, by a driver assistance system that is associated with the agricultural harvester and forms together with the cutting unit an automated cutting unit, at least one harvesting process strategy, from a plurality of harvesting process strategies, in performing an automatic harvesting process on a field;
  autonomously selecting, by the driver assistance system, at least one cutting unit parameter, the at least one cutting unit parameter for implementing the selected at least one harvesting process strategy and being specified to the cutting unit, wherein the cutting unit is controlled according to the selected at least one harvesting process strategy;
  autonomously detecting a respective harvesting process deviation, from a plurality of potential harvesting process deviations from the automatic harvesting process on the field, on the field that is being worked or to be worked, with the plurality of harvesting process deviations indicative of different deviations from regulating the cutting unit according to the selected at least one harvesting process strategy in performing the automatic harvesting process on the field; and
  responsive to autonomously detecting the respective harvesting process deviation:
    autonomously selecting, from a plurality of deviation regulation sequences, a respective deviation sequence correlated to the respective harvesting process deviation that is detected; and
    autonomously implementing the respective deviation sequence overriding control by the cutting unit according to the selected at least one harvesting process strategy.

2. The method of claim 1, wherein the plurality of potential harvesting process deviations indicative of different deviations from regulating the cutting unit according to the selected at least one harvesting process strategy in performing the automated harvesting process on the field comprises at least two of: entering a crop, driving with a spray trail, exiting a crop, or driving in a headland; and wherein the respective deviation sequence comprises one or more commands tailored to the respective harvesting process deviation.

3. The method of claim 1, wherein autonomously detecting the respective harvesting process deviation is based on detecting the agricultural harvester in a predefined position in or with respect to the field.

4. The method of claim 3, wherein autonomously detecting the agricultural harvester in a predefined position in or with respect to the field comprises detecting each of:
    entering a crop;
    exiting the crop; or
    driving in a headland.

5. The method claim 1, wherein the cutting unit automatically controls one or more of a reel, a cutter bar, a cutting table, an intake auger, or conveyor belts as components of the cutting unit by setting one or more associated cutting unit parameters; and
    wherein the one or more associated cutting unit parameters comprise one or more of: cutter bar height; cutting angle; cutting table length; horizontal reel position; vertical reel position; reel speed; cutting frequency; intake auger height; or belt speed.

6. The method of claim 5, wherein, responsive to autonomously detecting driving into a crop, which is indicative of the respective harvesting process deviation that is detected, autonomously executing a regulation sequence to control the cutting unit parameter of vertical reel position in order to set the reel lower, thereby deviating from the selected at least one harvesting process strategy.

7. The method of claim 5, wherein, responsive to autonomously detecting driving with a spray trail, which is indicative of respective harvesting process deviation that is detected, autonomously executing a regulation sequence to control the cutting unit parameters of vertical reel position and cutting table length in order to lower the reel cyclically and reduce an extension length of the cutting table, thereby deviating from the selected at least one harvesting process strategy.

8. The method of claim 5, wherein, responsive to autonomously detecting exiting a crop, which is indicative of the respective harvesting process deviation that is detected, autonomously executing a regulation sequence to control the cutting unit parameter of vertical reel position in order to set the reel lower, thereby deviating from the selected at least one harvesting process strategy.

9. The method of claim 5, wherein, responsive to autonomously detecting driving into a headland, which is indicative of the respective harvesting process deviation that is detected, autonomously executing a regulation sequence to control the cutting unit parameters of horizontal reel position and cutting table length in order to lower the reel cyclically and then reduce reel extension length at the same time as cutting table extension length, thereby deviating from the selected at least one harvesting process strategy.

10. The method of claim 1, wherein responsive to autonomously detecting the respective harvesting process deviation, autonomously recording forefield information and machine-specific parameters by at least one sensor assembly;
    wherein the forefield information comprises one or more of: a crop height; a crop edge; reaching standing crop when driving into a crop; and leaving the standing crop when driving out of the crop; and
    wherein the machine-specific parameters comprises one or more of: a set cutting unit height; a layer height in a conveying device downstream from the cutting unit; a steering angle; a driving speed; or a set steering mode for lane guidance.

11. The method according to claim 10, wherein the crop edge or a spray trail is used as a control variable for controlling or regulating the lane guidance in a respective steering mode.

12. The method of claim 10, wherein the driver assistance system includes a sensor assembly for generating forefield information;
    wherein the sensor assembly has a laser-based sensor system which scans a forefield area with electromagnetic transmission beams running in a plurality of scanning planes in order to generate distance information on a predetermined, relevant forefield area of the agricultural harvester;
    wherein a respective contact line is calculated by the laser-based sensor system for the plurality of scanning planes from the distance information; and
    wherein a three-dimensional nature of the forefield area is inferred from one or both of an arrangement or a shape of the contact lines associated with the plurality of scanning planes.

13. The method of claim 12, wherein a laser-based sensor system detects harvested crop in a headland area, standing crop, a transition from standing crop into the headland area, or from the headland area into the standing crop.

14. A self-propelled agricultural harvester comprising:
    a cutting unit configured to cut and pick up harvested material; and
    a driver assistance system comprising at least one processor and at least one memory for storing data, wherein the driver assistance system together with the cutting unit form an automated cutting unit that is configured to:
        select, by a driver assistance system that associated with the agricultural harvester and forms together with the cutting unit an automated cutting unit, at least one harvesting process strategy from a plurality of harvesting process strategies, in performing an automatic harvesting process on a field;
        autonomously select, by the driver assistance system, at least one cutting unit parameter, the at least one cutting unit parameter for implementing the selected at least one harvesting process strategy and being specified to the cutting unit, wherein the cutting unit is controlled according to the selected at least one harvesting process strategy;
        autonomously detect a respective harvesting process deviation, from a plurality of potential harvesting process deviations, on the field that is being worked or to be worked, with the plurality of harvesting process deviations indicative of different deviations from regulating the cutting unit according to the selected at least one harvesting process strategy in performing the automatic harvesting process on the field; and
        responsive to autonomously detecting the respective harvesting process deviation:
            autonomously select, from a plurality of deviation regulation sequences, a respective deviation sequence correlated to the respective harvesting process deviation that is detected; and
            autonomously implement the respective deviation sequence to temporarily override control of the cutting unit according to the selected at least one harvesting process strategy.

15. The agricultural harvester of claim 14, wherein the plurality of potential harvesting process deviations indicative of different deviations from regulating the cutting unit according to the selected at least one harvesting process strategy in performing the automatic harvesting process on the field comprises at least two of: entering a crop, driving with a spray trail, exiting a crop, or driving in a headland.

16. The agricultural harvester of claim 14, wherein the automated cutting unit is configured to detect the respective harvesting process deviation based on detecting the agricultural harvester in a predefined position in or with respect to the field.

17. The agricultural harvester of claim 16, wherein the automated cutting unit is configured to detect the agricultural harvester in a predefined position in or with respect to the field by detecting each of:
 entering a crop;
 exiting the crop; or
 driving in a headland.

18. The agricultural harvester of claim 14, wherein the cutting unit is configured to automatically control one or more of a reel, a cutter bar, a cutting table, an intake auger, or conveyor belts as components of the cutting unit by setting one or more associated cutting unit parameters; and
 wherein the one or more associated cutting unit parameters comprise one or more of: cutter bar height; cutting angle; cutting table length; horizontal reel position; vertical reel position; reel speed; cutting frequency; intake auger height; or belt speed.

19. The method of claim 1, wherein the plurality of potential harvesting process deviations comprises each of: entering a crop, driving with a spray trail, exiting a crop, or driving in a headland; and
 wherein entering a crop deviation sequence is tailored to the respective harvesting process deviation of entering the crop;
 wherein driving with a spray trail sequence is tailored to the respective harvesting process deviation of driving with the spray trail;
 wherein exiting a crop deviation sequence is tailored to the respective harvesting process deviation of exiting the crop; and
 wherein driving in a headland sequence is tailored to the respective harvesting process deviation of driving in the headland.

20. The agricultural harvester of claim 14, wherein the plurality of potential harvesting process deviations comprises each of: entering a crop, driving with a spray trail, exiting a crop, or driving in a headland; and
 wherein entering a crop deviation sequence is tailored to the respective harvesting process deviation of entering the crop;
 wherein driving with a spray trail sequence is tailored to the respective harvesting process deviation of driving with the spray trail;
 wherein exiting a crop deviation sequence is tailored to the respective harvesting process deviation of exiting the crop; and
 wherein driving in a headland sequence is tailored to the respective harvesting process deviation of driving in the headland.

* * * * *